(12) United States Patent
Kasahara et al.

(10) Patent No.: US 9,815,024 B2
(45) Date of Patent: Nov. 14, 2017

(54) ELECTRICALLY HEATED CATALYST DEVICE AND ITS MANUFACTURING METHOD

(71) Applicant: TOYOTA JIDOSHA KABUSHIKI KAISHA, Toyota (JP)

(72) Inventors: Koji Kasahara, Toyota (JP); Natsuki Sugiyama, Nisshin (JP); Masao Nakayama, Nagoya (JP); Yuki Tomitaka, Okazaki (JP); Hideji Naito, Tajimi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 374 days.

(21) Appl. No.: 14/631,387

(22) Filed: Feb. 25, 2015

(65) Prior Publication Data

US 2015/0290584 A1    Oct. 15, 2015

(30) Foreign Application Priority Data

Apr. 11, 2014    (JP) .................................. 2014-082011

(51) Int. Cl.
| | |
|---|---|
| *F01N 3/20* | (2006.01) |
| *B01D 53/94* | (2006.01) |
| *F01N 3/28* | (2006.01) |

(52) U.S. Cl.
CPC ......... *B01D 53/94* (2013.01); *B01D 53/9454* (2013.01); *F01N 3/2026* (2013.01);
(Continued)

(58) Field of Classification Search
None
See application file for complete search history.

(56) References Cited

U.S. PATENT DOCUMENTS

| | | | |
|---|---|---|---|
| 6,166,358 A | 12/2000 | Abe | |
| 9,464,549 B2 * | 10/2016 | Nishigaya | ............. F01N 3/2026 |

(Continued)

FOREIGN PATENT DOCUMENTS

| | | |
|---|---|---|
| CN | 101534930 A | 9/2009 |
| CN | 102686313 A | 9/2012 |

(Continued)

OTHER PUBLICATIONS

Decision to Grant a Patent dated May 30, 2016 in Japanese Patent Application No. 2014-082011 (with English Translation).

*Primary Examiner* — Walter D Griffin
*Assistant Examiner* — Jelitza Perez
(74) *Attorney, Agent, or Firm* — Oblon, McClelland, Maier & Neustadt, L.L.P.

(57) ABSTRACT

An electrically heated catalyst device includes a catalyst support supporting a catalyst, a surface electrode disposed on an outer surface of the catalyst support and extending in an axis direction of the catalyst support, a wiring line member including a root section extending in the axis direction of the catalyst support and comb teeth-like wiring lines extending from the root section in a circumferential direction of the catalyst support and fixed to the surface electrode, an outer cylinder covering an outer surface of the catalyst support, and a holding member holding the catalyst support and packed between the catalyst support and the outer cylinder, in which the catalyst support is heated by feeding a current through the surface electrode and the wiring line member. At least a plurality of through-holes or a plurality of protrusions are formed in the root section covered by the holding member.

4 Claims, 9 Drawing Sheets

(52) U.S. Cl.
CPC ........ *F01N 3/2828* (2013.01); *F01N 2260/10* (2013.01); *Y02T 10/22* (2013.01); *Y02T 10/26* (2013.01)

(56) References Cited

U.S. PATENT DOCUMENTS

| | | |
|---|---|---|
| 2001/0047796 A1 | 12/2001 | Yamada et al. |
| 2012/0121476 A1 | 5/2012 | Kinoshita et al. |
| 2013/0062328 A1 | 3/2013 | Shimoda et al. |
| 2013/0224080 A1 | 8/2013 | Ishihara et al. |
| 2014/0301908 A1 | 10/2014 | Takagaki et al. |

FOREIGN PATENT DOCUMENTS

| | | |
|---|---|---|
| JP | 11-093649 A | 4/1999 |
| JP | 2002-061551 A | 2/2002 |
| JP | 2002-070545 A | 3/2002 |
| JP | 2012-066188 A | 4/2012 |
| JP | 2012-112302 A | 6/2012 |
| JP | 2013-083162 A | 5/2013 |
| JP | 2013-136966 A | 7/2013 |
| JP | 2013 136997 | 7/2013 |
| JP | 2013-198887 A | 10/2013 |
| JP | 5365746 B2 | 12/2013 |
| JP | 2015-203324 A | 11/2015 |
| WO | WO 2008/032934 A1 | 3/2008 |
| WO | 2013/038449 A1 | 3/2013 |
| WO | WO 2013/098889 A1 | 7/2013 |

\* cited by examiner

ELECTRICALLY HEATED CATALYST DEVICE AND ITS MANUFACTURING METHOD

INCORPORATION BY REFERENCE

This application is based upon and claims the benefit of priority from Japanese patent application No. 2014-082011, filed on Apr. 11, 2014, the disclosure of which is incorporated herein in its entirety by reference.

BACKGROUND OF THE INVENTION

1. Field of the Invention

The present invention relates to an electrically heated catalyst device and its manufacturing method.

2. Description of Related Art

In recent years, EHC (electrically heated catalyst) devices have been attracting attention as an exhaust purification device that purifies exhaust gases discharged from engines of automobiles and the like. In EHC devices, it is possible to enhance the purification efficiency of the exhaust gas by electrically heating and forcibly activating a catalyst even under such conditions that the temperature of the exhaust gas is low and thus the catalyst cannot be easily activated, such as immediately after the engine is started. It should be noted that unburned HC (hydrocarbon), CO (carbon monoxide), NOx (nitrogen oxide) and so on contained in an exhaust gas are removed by the catalytic reaction.

Japanese Unexamined Patent Application Publication No. 2013-136997 discloses an EHC device in which on the outer surface of a cylindrical catalyst support that has a honey-comb structure and supports a catalyst such as platinum and palladium, a pair of surface electrodes extending in the axial direction of the catalyst support are disposed opposite to each other. A plurality of comb teeth-like wiring lines extending in the circumferential direction are connected to each of the surface electrodes and a current is supplied to the surface electrode through the comb teeth-like wiring lines.

Since the EHC device is disposed on an exhaust path of an automobile or the like, the above-described surface electrodes and wiring lines are composed of metallic material having excellent heat resistance, oxidation resistance at a high temperature, corrosion resistance in an exhaust-gas atmosphere and so on as well as excellent electrical conductivity. Meanwhile, as for the material for the above-described catalyst support, ceramic material such as SiC (silicon carbide) is used. As a result, when the EHC device is electrically heated, a thermal stress occurs due to the difference between the linear expansion coefficient of the metallic material forming the surface electrodes and wiring lines and that of the ceramic material forming the catalyst support.

In an EHC device disclosed in in FIGS. 1 and 2 of Japanese Unexamined Patent Application Publication No. 2013-136997, each of the comb teeth-like wiring lines is fixed to a surface electrode by using a button-like fixing layer so that the thermal stress is reduced. Further, since the comb teeth-like wiring lines are arranged in parallel with each other from one end of the surface electrode to the other end in the axial direction of the catalyst support, the current spreads in the axial direction of the catalyst support in the surface electrode and thus the entire catalyst support can be heated.

SUMMARY OF THE INVENTION

The inventors have found the following problem in the above-described electrically heated catalyst devices. FIG. 8 is a diagram for explaining the problem to be solved by the present invention, and is a plan view of an example of a related art electrically heated catalyst device as viewed from directly above its surface electrode. As shown in FIG. 8, a surface electrode 20 extending in the axial direction of the catalyst support is formed on the outer surface of a cylindrical catalyst support 10. A wiring line member 30 including a plurality of comb teeth-like wiring lines 31 extending in the circumferential direction is fixed to the surface electrode 20 by button-like fixing layers 40. The cylindrical catalyst support 10 including the wiring line member 30 is entirely covered by a flexible mat 50.

In the electrically heated catalyst device in the related art, as shown in FIG. 8, comb teeth-like wiring lines 31 located at both ends of the wiring line member 30 in the axial direction of the catalyst support tend to break near their bases (near the boundary with a root section 32) due to repeated rises and falls in the temperature. The assumed mechanism for causing the problem is explained hereinafter.

FIG. 9 is a cross section taken along the line IX-IX in FIG. 8, and shows deformation of the root section 32 of the wiring line member 30 when the temperature has risen and fallen. The catalyst support 10 covered with the mat 50 is pressed into an outer cylinder 70. Therefore, as shown in the upper section of FIG. 9, although the root section 32 of the comb teeth-like wiring lines 31 is not fixed to the catalyst support 10, the root section 32 is pressed onto and thereby restrained on the catalyst support 10 by the mat 50. Meanwhile, an opening 51 for allowing a pull-out section 33 of the wiring line member 30 to be pulled out to the outside is formed in the mat 50. Therefore, the root section 32 extending in the axial direction of the catalyst support is not restrained in the central part thereof by the mat 50.

As shown in the middle section of FIG. 9, when the temperature has risen, the root section 32 expands inwardly (toward the central part thereof) because the ends of the root section 32 are restrained by the mat 50 and cannot move outwardly. As a result, the central part of the root section 32 rises from the catalyst support 10. Next, as shown in the lower section of FIG. 9, the central part of the root section 32, which is in a raised state due to the raised temperature, is not pulled into its original place located below the mat 50 even when the temperature has fallen. As a result, the parts of the root section 32 located below the mat 50 contract inwardly and hence the ends of the root section 32 move inwardly from the places where the root section 32 is originally disposed. It should be noted that the root section 32 has slid with respect to the mat 50. Further, the amount of the slide varies according to the position along the root section 32. That is, the closer the position along the root section 32 is to either end thereof, the larger the amount of the slide becomes. This phenomenon increases as the rise-and-fall of the temperature is repeated.

The present invention has been made in view of the above-described circumstances, and an object thereof is to provide an electrically heated catalyst device capable of preventing comb teeth-like wiring lines located at both ends of the wiring line member in the axial direction of the catalyst support from being broken near their bases.

An electrically heated catalyst device according to an aspect of the present invention includes:

a catalyst support supporting a catalyst;

a surface electrode disposed on an outer surface of the catalyst support, the surface electrode extending in an axis direction of the catalyst support;

a wiring line member including a root section extending in the axis direction of the catalyst support and comb teeth-like wiring lines extending from the root section in a circumferential direction of the catalyst support, the comb teeth-like wiring lines being fixed to the surface electrode;

an outer cylinder covering the outer surface of the catalyst support; and a holding member holding the catalyst support, the holding member being packed between the catalyst support and the outer cylinder, in which the catalyst support is heated by feeding a current through the surface electrode and the wiring line member, and at least a plurality of through-holes or a plurality of protrusions are formed in the root section of the wiring line member covered with the holding member.

Since at least a plurality of through-holes or a plurality of protrusions are formed in the root section of the wiring line member covered with the holding member, the slide of the root section with respect to the holding member is suppressed. Therefore, the inward shifting of both ends of the root section, which is caused by repeated rises and falls of the temperature, can be suppressed. Consequently, it is possible to prevent comb teeth-like wiring lines located at both ends of the wiring line member in the axial direction of the catalyst support from being broken near their bases.

Preferably, the plurality of through-holes or the plurality of protrusions are arranged in a row in the axial direction of the catalyst support from a central part of the wiring line member towards both ends thereof. With this configuration, the above-described breaking of comb teeth-like wiring lines near their bases can be suppressed more effectively.

Further, it is preferable that an interval between adjacent through-holes or adjacent protrusions become narrower as a location of the interval gets away from the central part of the wiring line member and gets closer to either end thereof in the axial direction of the catalyst support. With this configuration, the above-described breaking of comb teeth-like wiring lines near their bases can be suppressed more effectively.

Further, an opening for allowing the wiring line member to be pulled out is preferably formed in the holding member above the root section. In this case, the present invention is especially effective.

A manufacturing method of an electrically heated catalyst device according to another aspect of the present invention includes:

providing a surface electrode on an outer surface of a catalyst support supporting a catalyst, the surface electrode extending in an axis direction of the catalyst support;

fixing comb teeth-like wiring lines of a wiring line member to the surface electrode, the wiring line member including a root section extending in the axis direction of the catalyst support and the comb teeth-like wiring lines extending from the root section in a circumferential direction of the catalyst support;

covering the outer surface of the catalyst support with the wiring line member fixed thereon with a holding member for holding the catalyst support; and pressing the catalyst support covered with the holding member into an outer cylinder, in which at least a plurality of through-holes or a plurality of protrusions are formed in the root section of the wiring line member, which is to be covered with the holding member, prior to the covering of the outer surface of the catalyst support with the holding member.

Since at least a plurality of through-holes or a plurality of protrusions are formed in the root section of the wiring line member, which is to be covered with the holding member, prior to the covering of the outer surface of the catalyst support with the holding member, the slide of the root section with respect to the holding member is suppressed. Therefore, the inward shifting of both ends of the root section, which is caused by repeated rises and falls of the temperature, can be suppressed. Consequently, it is possible to prevent comb teeth-like wiring lines located at both ends of the wiring line member in the axial direction of the catalyst support from being broken near their bases.

The present invention can provide an electrically heated catalyst device capable of preventing comb teeth-like wiring lines located at both ends of the wiring line member in the axial direction of the catalyst support from being broken near their bases.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Specific exemplary embodiments to which the present invention is applied are explained hereinafter in detail with reference to the drawings. However, the present invention is not limited to the exemplary embodiments shown below. Further, for clarifying the explanation, the following descriptions and the drawings are simplified as appropriate.

(First Exemplary Embodiment)

Figure 1:
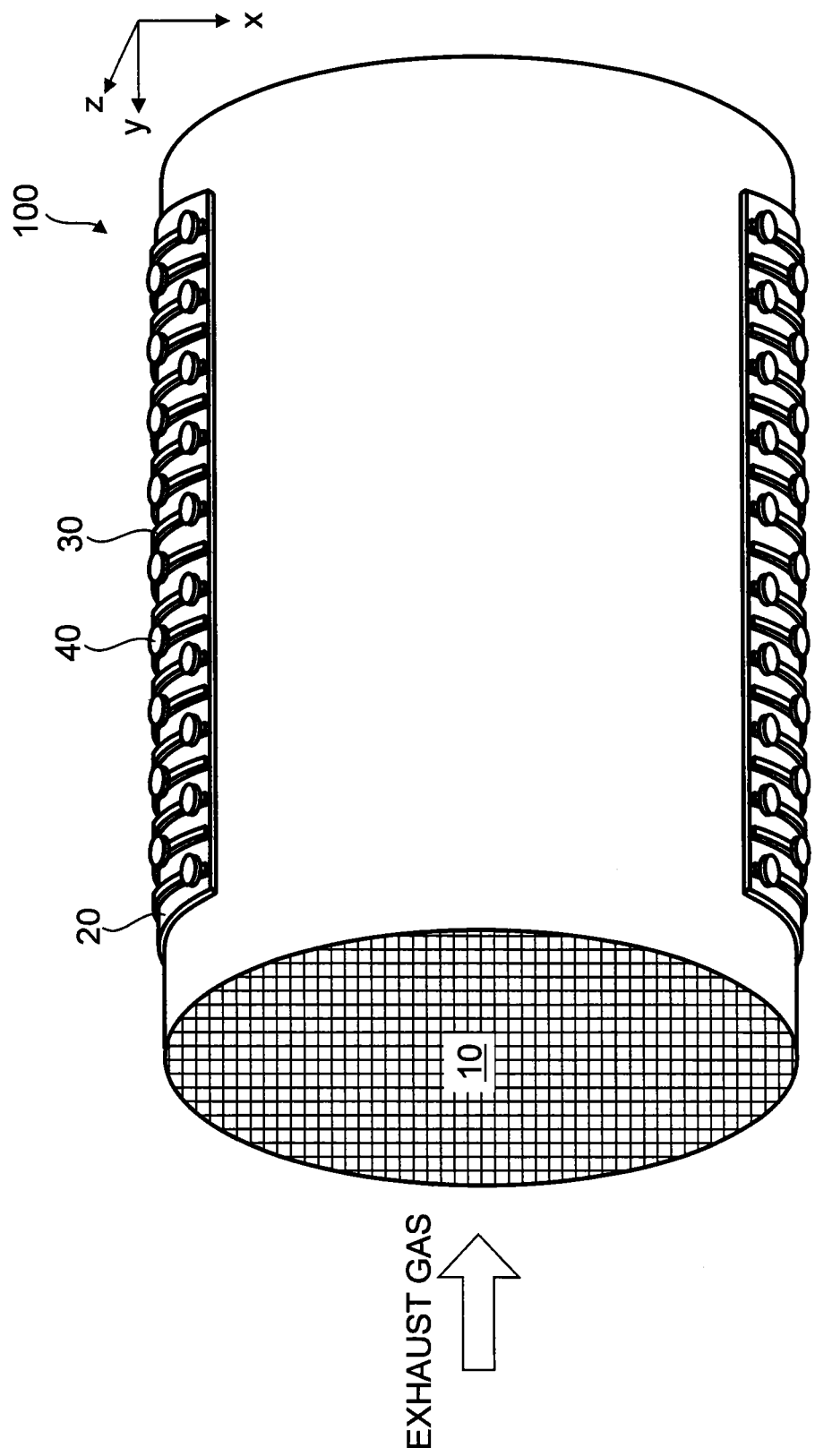
FIG. 1 is a perspective view of an electrically heated catalyst device according to a first exemplary embodiment.
Figure 2:
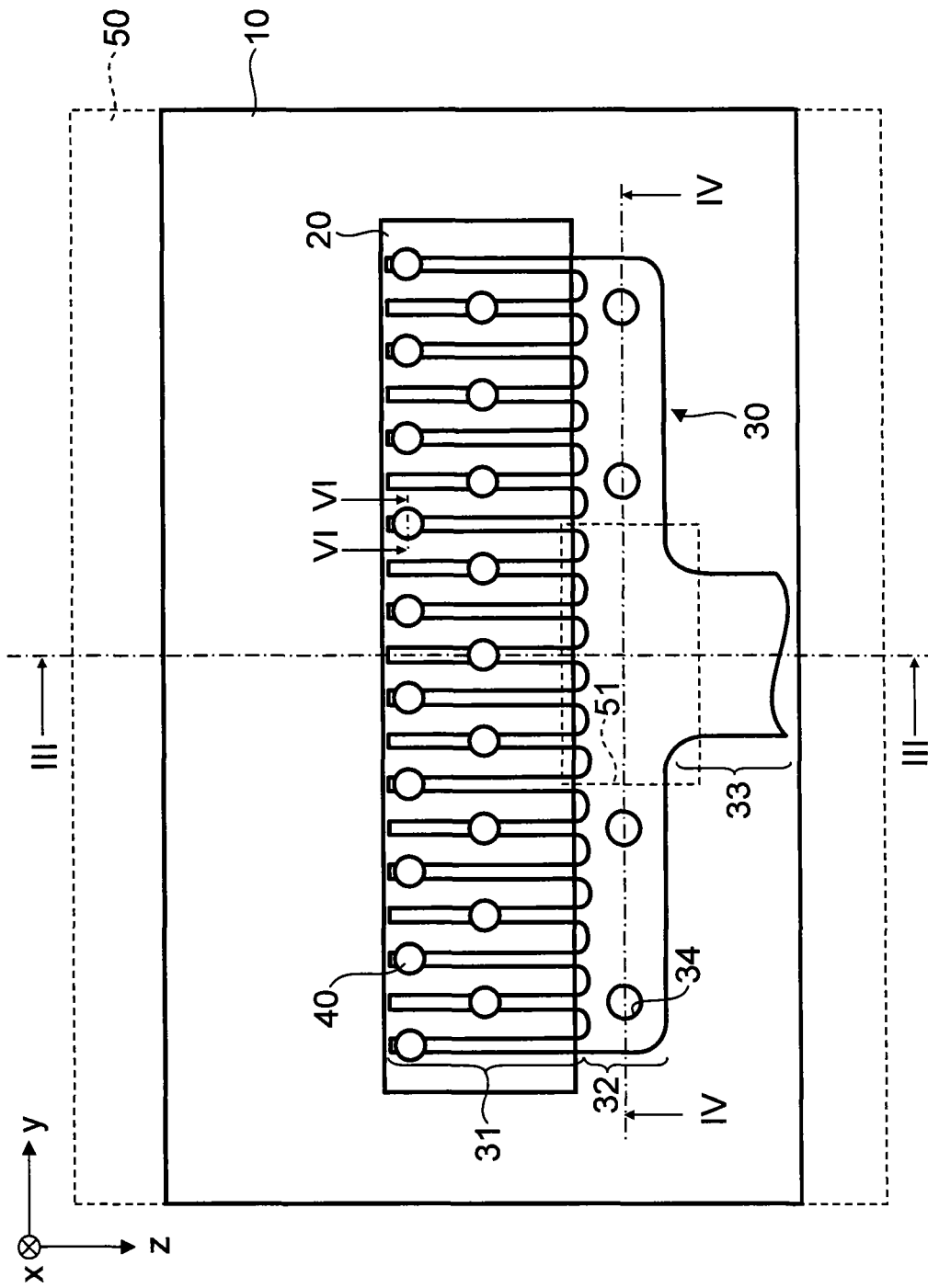
FIG. 2 is a plan view of a surface electrode 20 of the electrically heated catalyst device shown in FIG. 1 as viewed from directly above the surface electrode 20.
Figure 3:
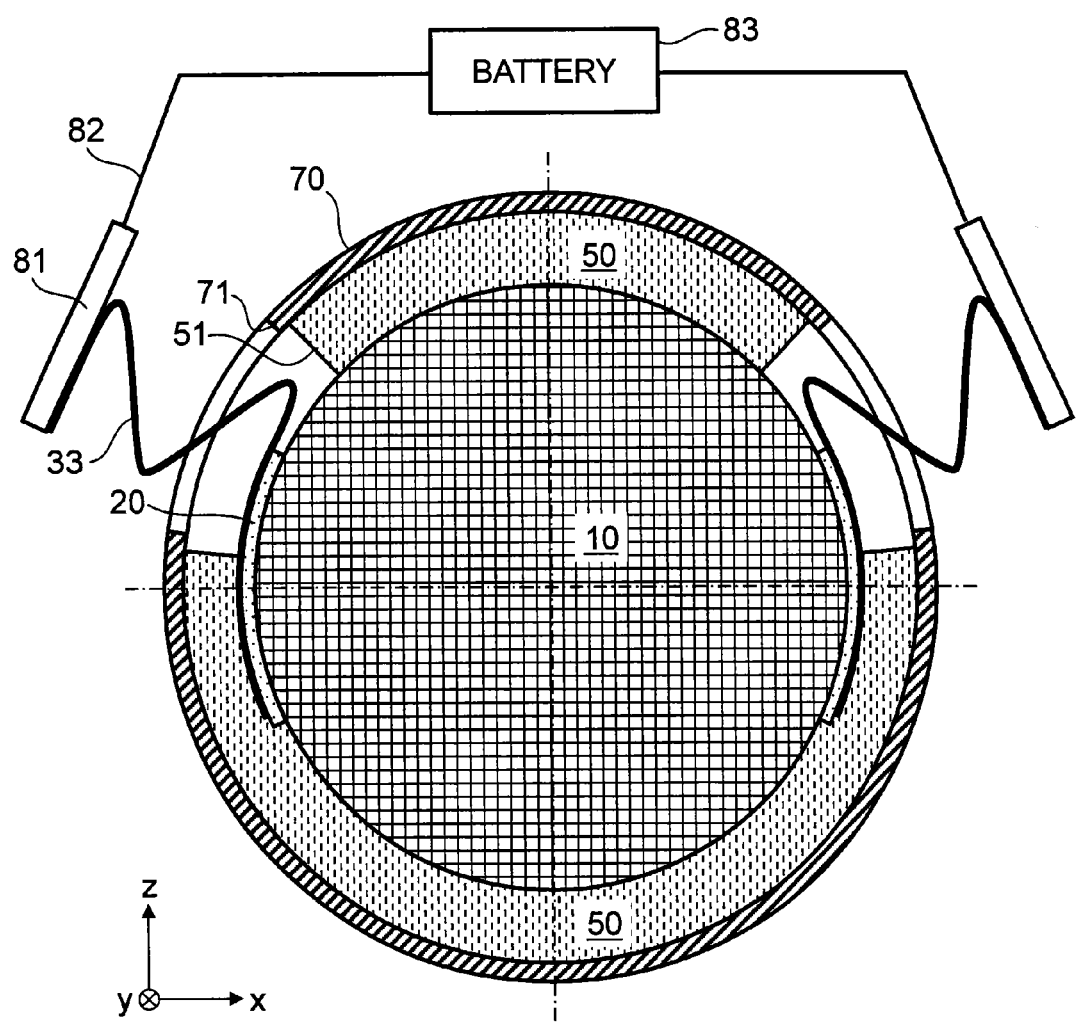
FIG. 3 is a lateral cross section of the electrically heated catalyst device taken along the line in FIG. 2.

Firstly, an electrically heated catalyst device according to a first exemplary embodiment is explained with reference to FIGS. 1 to 3. FIG. 1 is a perspective view of an electrically heated catalyst device according to a first exemplary embodiment. FIG. 2 is a plan view of a surface electrode 20 of the electrically heated catalyst device shown in FIG. 1 as viewed from directly above the surface electrode 20 (from the negative side in the x-axis direction). FIG. 3 is a lateral cross section of the electrically heated catalyst device taken along the line in FIG. 2.

Needless to say, the right-hand xyz-coordinate systems in the drawings are shown just for explaining the positional relation among the components. The same xyz-coordinate system is shown in each of the drawings, and the y-axis direction is in parallel with the axial direction of the catalyst support 10. Note that when an electrically heated catalyst device 100 is used, it is preferable that the positive direction in the z-axis direction be conformed to the vertically upward direction as shown in FIG. 3.

An electrically heated catalyst device 100 is provided, for example, on an exhaust path of an automobile or the like and purifies an exhaust gas discharged from the engine. As shown in FIG. 1, the electrically heated catalyst device 100 includes surface electrodes 20, wiring line members 30, and fixing layers 40 on the outer surface of a catalyst support 10. Further, as shown in FIGS. 2 and 3, the electrically heated catalyst device 100 includes a mat 50 and an outer cylinder 70.

Note that the illustrations of the mat 50 and the outer cylinder 70 are omitted in FIG. 1. Further, FIG. 2 shows the positional relation among the catalyst support 10, the wiring line member 30, the fixing layers 40, and the mat 50 for only one of the surface electrodes 20. However, these components are also arranged in a similar manner in the other surface electrode 20. Specifically, as shown in FIGS. 1 and 3, the two surface electrodes 20 are mirror-symmetrical with respect to a symmetry plane in parallel with the yz-plane.

The catalyst support 10 is a porous member that supports a catalyst such as platinum and a palladium. Further, since the catalyst support 10 itself is electrically heated, the catalyst support 10 is preferably made of, for example, conductive ceramics, in particular, SiC (silicon carbide). As shown in FIG. 1, the catalyst support 10 has a roughly cylindrical external shape and has a honeycomb structure inside thereof. As indicated by the outlined arrow, an exhaust gas passes through the inside of the catalyst support 10 in the axial direction (y-axis direction).

As shown in FIG. 1, the surface electrodes 20 are a pair of electrodes that are formed on the outer surface of the catalyst support 10 and disposed opposite to each other with the catalyst support 10 interposed therebetween. The surface electrodes 20 are physically in contact with and electrically connected to the catalyst support 10. Further, as shown in FIG. 2, each of the surface electrodes 20 has a rectangular planar shape and extends in the axial direction of the catalyst support (y-axis direction). Further, as shown in FIG. 3, the surface electrodes 20 are electrically connected to a battery 83 through the wiring line members 30, external electrodes 81, and external wiring lines 82. With this configuration, a current is supplied to the catalyst support 10 and the catalyst support 10 is thereby electrically heated. Note that one of the pair of the surface electrodes 20 serves as a positive pole and the other surface electrode 20 serves as a negative pole. However, either of the surface electrodes 20 can serve as a positive pole or a negative pole. That is, there is no restriction on the direction of the current flowing through the catalyst support 10.

Each of the surface electrodes 20 is, for example, a thermal-sprayed film having a thickness of about 50 to 200 μm formed by plasma spraying. Since a current flows through the surface electrode 20 as in the case of the wiring line member 30, this thermal-sprayed film needs to be a metal-based film. Regarding a metal for forming the matrix of the thermal-sprayed film, since it needs to be robust enough for use at a high temperature equal to or higher than 800° C., a metal having excellent oxidation resistance at a high temperature such as a Ni—Cr alloy (with a Cr content of 20 to 60 mass %) and an MCrAlY alloy (M is at least one material selected from Fe, Co and Ni) is preferred. Note that each of the above-described Ni—Cr alloy and the MCrAlY alloy may contain other alloy elements.

As shown in FIGS. 1 and 2, the wiring line members 30 are disposed on their respective surface electrodes 20. As shown in FIG. 2, each of the wiring line members 30 includes comb teeth-like wiring lines 31, a root section 32, and a pull-out section 33. Details of these components are described later. Each of the wiring line members 30 is, for example, a sheet metal having a uniform thickness of about 0.1 mm. Further, the wiring line members 30 are preferably each made of, for example, a heat-resistant (oxidation-resistant) alloy such as a stainless-steel-based alloy, a Ni-based alloy, and a Co-based alloy so that they can be used at a high temperature equal to or higher than 800° C. The use of a stainless-steel-based alloy is preferred in view of its properties, such as electrical conductivity, heat resistance, oxidation resistance at a high temperature, and corrosion resistance in an exhaust-gas atmosphere, as well as its cost.

As shown in FIG. 2, the plurality of comb teeth-like wiring lines 31 are disposed so as to extend in the circumferential direction of the catalyst support over roughly the entire formation area of the surface electrode 20 and arranged in the axial direction of the catalyst support (y-axis direction) at roughly regular intervals. Further, all the comb teeth-like wiring lines 31 are connected to the root section 32 on the positive side in the z-axis direction of the formation area of the surface electrode 20. The width of each comb teeth-like wiring line 31 is, for example, about 1 mm. In the example shown in the figure, 19 comb teeth-like wiring lines 31 are provided on the surface electrode 20. Each of the comb teeth-like wiring lines 31 is fixed to the surface electrode 20 by the fixing layer 40 and thereby electrically connected to the surface electrode 20. Needless to say, the number of the comb teeth-like wiring lines 31 is not limited to 19 and may be determined as desired.

As shown in FIG. 2, the root section 32 is a part that extends along the surface electrode 20 in the axial direction of the catalyst support (y-axis direction). All the comb teeth-like wiring lines 31 extend from the root section 32 in the circumferential direction of the catalyst support. Although the root section 32 is fixed to neither the catalyst support 10 nor the surface electrode 20, the root section 32 is pressed onto and thereby restrained on the catalyst support 10 by the mat 50. In contrast to this, since an opening 51 is formed in the mat 50 above the root section 32, the central part of the root section 32 in the longitudinal direction thereof is not restrained by the mat 50.

Figure 4:
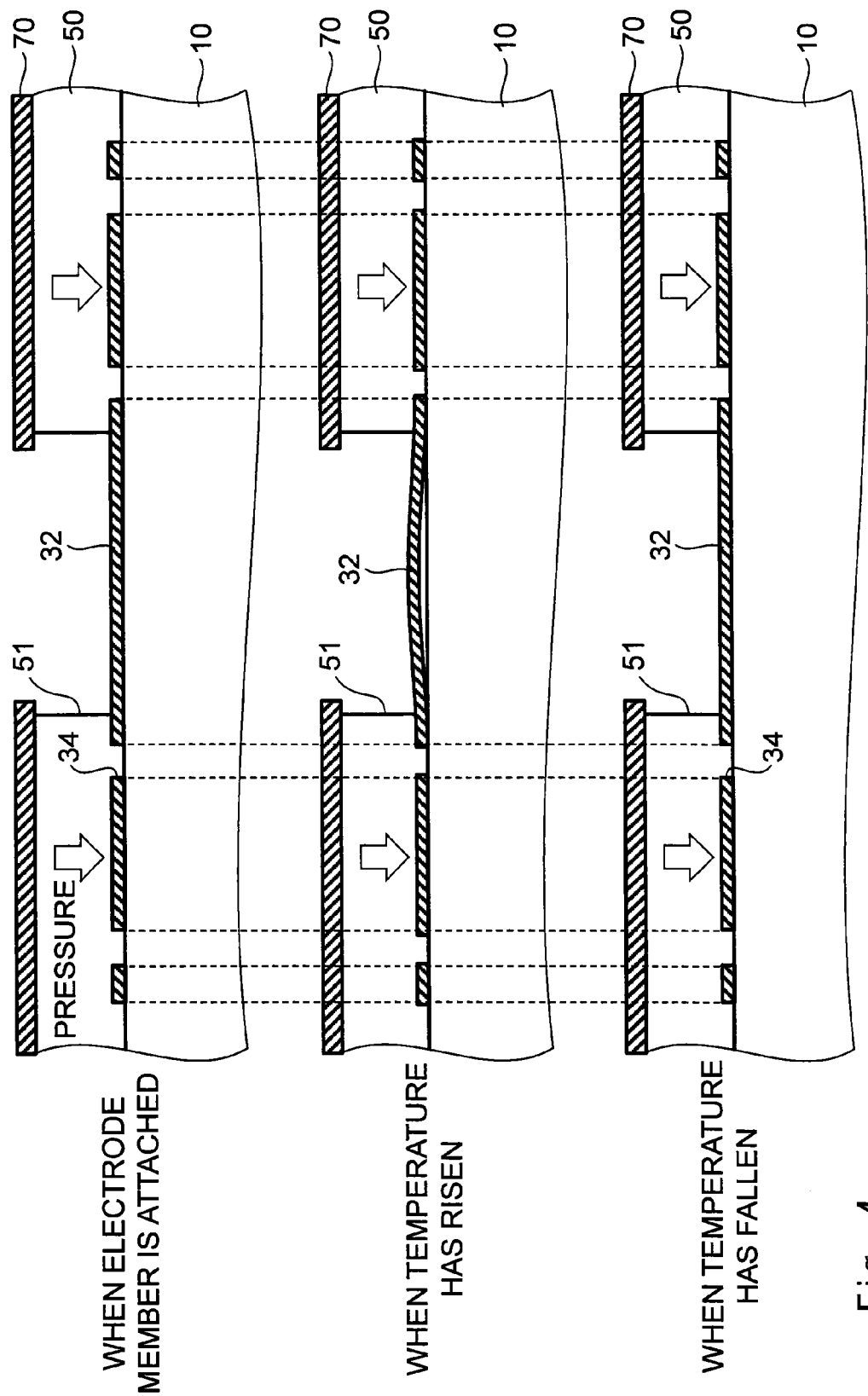
FIG. 4 is cross sections taken along the line IV-IV in FIG. 2, and shows deformation of a root section 32 of a wiring line member 30 when the temperature has risen and fallen.

It should be noted that, as shown in FIG. 2, in the electrically heated catalyst device 100 according to this exemplary embodiment, through-holes 34 are formed in the root section 32 in order to suppress the slide of the root section 32 with respect to the mat 50. Note that FIG. 4 is cross sections taken along the line IV-IV in FIG. 2, and shows deformation of the root section 32 of the wiring line member 30 when the temperature has risen and fallen. As shown in the upper section of FIG. 4, since parts of the mat 50 get into the through-holes 34, the mat 50 is pinned (i.e., fixed) by the through-holes 34 and the slide of the root section 32 with respect to the mat 50 is thereby suppressed.

Figure 9:
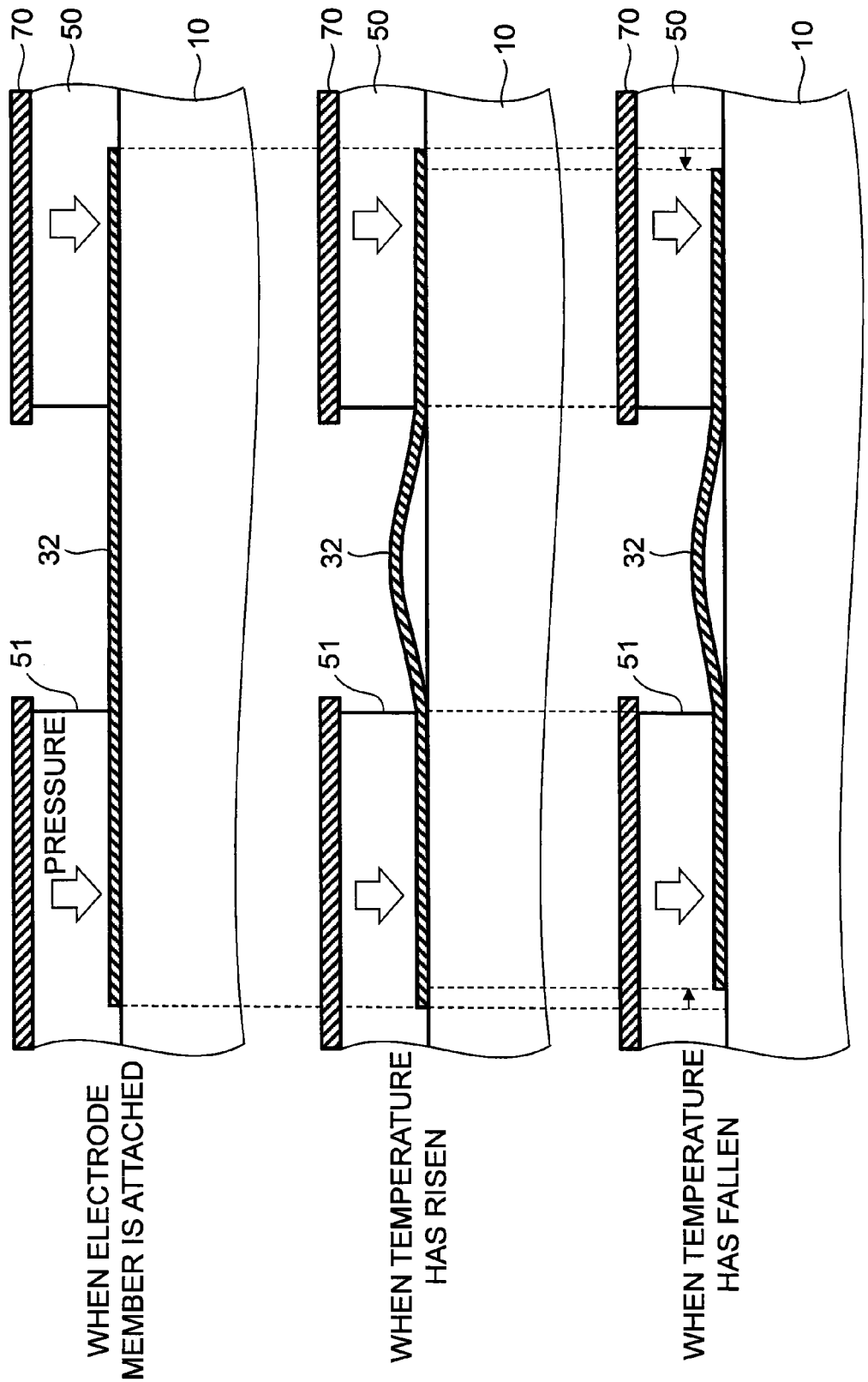
FIG. 9 is a cross section taken along the line IX-IX in FIG. 8, and shows deformation of a root section 32 of a wiring line member 30 when the temperature has risen and fallen.

As shown in the middle section of FIG. 4, when the temperature has risen, the deformation caused by the thermal expansion is dispersed over the area between the through-holes 34, or the area between the through-holes 34 and the root section 32. As a result, the rise of the central part of the root section 32 from the catalyst support 10 like the one shown in the middle section of FIG. 9 is reduced. Further, as shown in the lower section of FIG. 4, when the temperature has fallen, the inward shifting of both ends of the root section 32 can be suppressed. As a result, it is possible to prevent comb teeth-like wiring lines 31 located at both ends of the wiring line member 30 from being broken near their bases.

As shown in FIG. 2, in the electrically heated catalyst device 100 according to this exemplary embodiment, two through-holes 34 are formed on each of the left and right sides of the central part of the root section 32 in the axial direction of the catalyst support (y-axis direction). That is, four through-holes 34 are formed in total in the electrically heated catalyst device 100. Note that only one through-hole 34 may be formed on each of the left and right sides of the central part of the root section 32. Alternatively, three or more through-holes 34 may be formed on each of the left and right sides of the central part of the root section 32. Further, there are no particular restrictions on the shape of the through-holes. However, shapes that make any stress concentration less likely to occur, such as a circular shape and an elliptic shape, are preferred.

Figure 5:
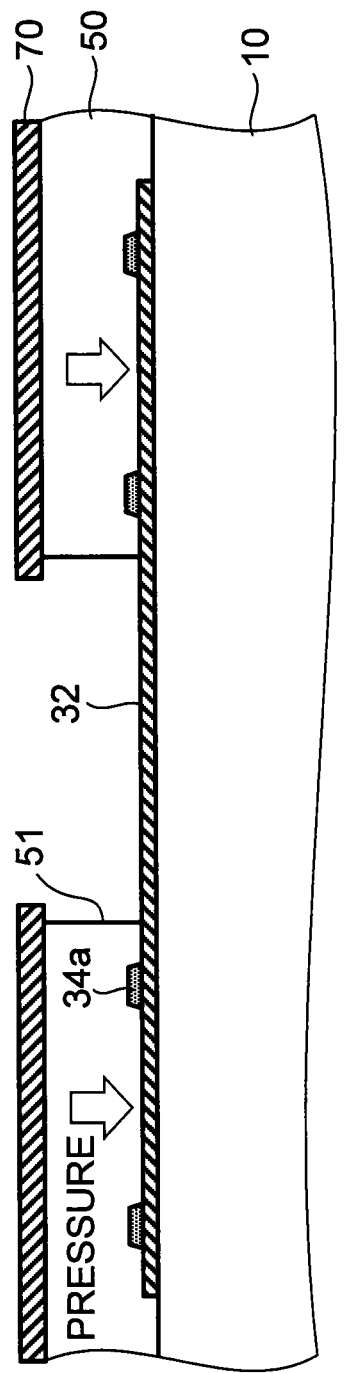
FIG. 5 is a cross section of an electrically heated catalyst device according to a modified example of the first exemplary embodiment.

Note that FIG. 5 is a cross section of an electrically heated catalyst device according to a modified example of the first exemplary embodiment. FIG. 5 corresponds to the upper section of FIG. 4. As shown in FIG. 5, protrusions 34a are provided in place of the through-holes 34 in the root section 32 in order to suppress the slide of the root section 32 with respect to the mat 50. Since the mat 50 is pinned (i.e., fixed) by the protrusions 34a, the slide of the root section 32 with respect to the mat 50 is suppressed. The protrusions 34a can be formed by thermal spraying at the same time that the fixing layers 40 (which are described later) are formed. Note that both through-holes 34 and protrusions 34a may be formed in the root section 32.

The pull-out section 33 is formed in the central part of the wiring line member 30 in the axial direction of the catalyst support (y-axis direction). Further, the pull-out section 33 is formed on the side of the root section 32 opposite to the comb teeth-like wiring lines 31. The pull-out section 33 is fixed to neither the catalyst support 10 nor the surface electrode 20. As shown in FIG. 3, the pull-out section 33 is pulled out to the outside of the outer cylinder 70 through the opening 51 of the mat 50 and the opening 71 of the outer cylinder 70. The pull-out section 33 is formed in a flexible accordion shape. In the manufacturing stage, the pull-out section 33 is in a folded state and accommodated in the opening 51 of the mat 50. Therefore, the pull-out section 33 does not interfere with the outer cylinder 70 and the catalyst support 10 equipped with the wiring line member 30 can be pressed into the outer cylinder 70. Then, after the catalyst support 10 is pressed into the outer cylinder 70, the pull-out section 33 can be easily pulled out to the outside of the outer cylinder 70. It should be noted that by using an annealed material (having an elongation of 15% or greater) obtained by annealing a cold-rolled sheet as the wiring line member 30, the pull-out section 33 can be easily folded into an according shape.

Figure 6:
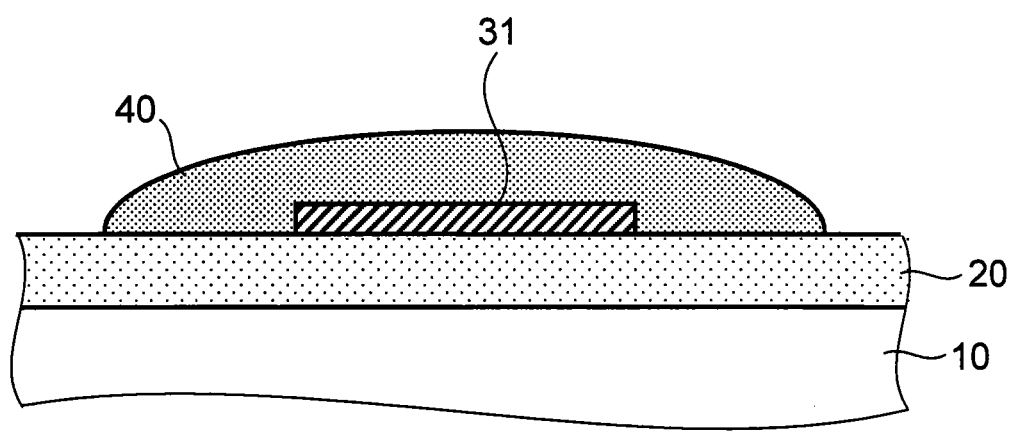
FIG. 6 is a cross section taken along the line VI-VI in FIG. 2, and is a cross section at a part where a fixed layer 40 is formed.

The fixing layers 40 are button-shaped thermal-sprayed films having a thickness of about 300 to 500 μm formed on the comb teeth-like wiring lines 31. The fixing layers 40 can be formed by disposing the wiring line member 30 on the surface electrode 20, disposing a masking jig on the wiring line member 30, and performing plasma spraying. The composition of the thermal-sprayed film may be similar to that of the above-described surface electrode 20. Note that FIG. 6 is a cross section taken along the line VI-VI in FIG. 2, and is a cross section at a part where a fixed layer 40 is formed. As show in FIG. 6, since the comb teeth-like wiring line 31 is sandwiched between the fixing layer 40 and the surface electrode 20, the comb teeth-like wiring line 31 is fixed to and electrically connected to the surface electrode 20.

In the example shown in FIG. 2, each of the comb teeth-like wiring lines 31 is fixed to the surface electrode 20 by one fixing layer 40. In other words, the part of each comb teeth-like wiring line 31 where no fixing layer 40 is formed is not directly fixed to the surface electrode 20. With this configuration, the thermal strain (thermal stress) that is caused by the difference between the linear expansion coefficient of the wiring line member 30, which is formed from a sheet metal, and that of the catalyst support 10, which is made of ceramics, can be reduced. That is, by forming each of the fixing layers 40 in a size as small as possible and distributing them, the aforementioned thermal strain (thermal stress) is reduced. Note that the number of the disposed fixing layers 40 and the interval therebetween may be determined as desired.

The mat (holding member) 50 is a flexible heat insulating member. As indicated by broken lines in FIG. 2, the mat 50 is wound over the entire outer surface of the catalyst support 10. Further, as shown in FIG. 3, the mat 50 is packed (i.e., interposed) between the catalyst support 10 and the outer cylinder 70. The catalyst support 10 is fixed to and held in the outer cylinder 70 by the mat 50, and sealed by the mat 50 so that no exhaust gas leaks to the outside of the outer cylinder 70.

Meanwhile, as shown in FIGS. 2 and 3, two openings 51 for allowing the pull-out sections 33 to be pulled out to the outside of the outer cylinder 70 are formed in the mat 50. As shown in FIG. 2, each of the openings 51 is formed in a rectangular shape in the central part of the wiring line member 30 in the axial direction of the catalyst support so that the place of the opening 51 corresponds to the formation place of the pull-out section 33. Further, as shown in the lateral cross section shown in FIG. 3, the two openings 51 are mirror-symmetrical with respect to a symmetry plane in parallel with the yz-plane. Note that although the opening 51 has a rectangular shape in the example shown in the drawings, there are no particular restrictions on its shape. For example, the opening 51 may have a circular shape or an ellipse shape.

The outer cylinder 70 is a casing for accommodating the catalyst support 10 therein, and is a pipe having a diameter slightly larger than that of the cylindrical catalyst support 10. The outer cylinder 70 covers roughly the entire circumferential surface of the catalyst support 10 with the mat 50 interposed therebetween. Note that the outer cylinder 70 is preferably made of a metal such as a stainless-steel-based alloy.

As shown in FIG. 3, openings 71 for allowing the pull-out sections 33 to be pulled out to the outside of the outer cylinder 70 are formed on the sides of the outer cylinder 70. That is, two openings 71 are formed in places corresponding to the formation places of the pull-out sections 33 (i.e., corresponding to the places of the openings 51 of the mat 50). The two openings 71 are located on slightly positive sides in the z-axis direction relative to the symmetry plane in parallel with the xy-plane of the outer cylinder 70, and are mirror-symmetrical with respect to the symmetry plane in parallel with the yz-plane. Note that there are no particular restrictions on the shape of the opening 71. For example, the opening 71 may have a circular shape or an ellipse shape.

With the above-described structure, in the electrically heated catalyst device 100, the catalyst support 10 is electrically heated between the pair of surface electrodes 20 and the catalyst supported on the catalyst support 10 is thereby activated. In this way, unburned HC (hydrocarbon), CO (carbon monoxide), NOx (nitrogen oxide) and so on contained in an exhaust gas that passes through the catalyst support 10 are removed by the catalytic reaction.

As described above, the through-holes 34 or the protrusions 34a are provided in the root section 32 of the wiring line member 30 in order to suppress the slide of the root section 32 with respect to the mat 50 in the electrically heated catalyst device 100 according to the first exemplary embodiment. Therefore, the inward shifting of both ends of the root section 32, which is caused by repeated rises and falls of the temperature, can be suppressed. Consequently, it is possible to prevent comb teeth-like wiring lines 31 located at both ends of the wiring line member 30 from being broken near their bases.

Next, a manufacturing method of an electrically heated catalyst device 100 according to the first exemplary embodiment is explained. Firstly, surface electrodes 20 are formed on the surface of a catalyst support 10 by, for example, plasma spraying. Next, wiring line members 30, in each of which a pull-out section 33 is folded into an accordion shape and a plurality of through-holes 34 are formed in its root section 32, are disposed on the surface electrodes 20. Then, fixing layers 40 are formed on the wiring line members 30 by plasma spraying using a masking jig. As a result, the wiring line members 30 are fixed to the surface electrodes 20.

Next, a mat 50 with openings 51 whose places corresponding to the formation places of the pull-out sections 33 is wound over the outer surface of the catalyst support 10, in which the surface electrodes 20, the wiring line members 30, and the fixing layers 40 were formed.

Next, the catalyst support 10, around which the mat 50 was wound, is pressed into an outer cylinder 70. After that, by extending the pull-out sections 33, which were folded into the accordion shape, the pull-out sections 33 are pulled out to the outside of the outer cylinder 70 through the openings 71.

Finally, the pull-out sections 33 are fixed to external electrodes 81 by using screws, by welding, or by using other methods.

Through the above-described processes, the electrically heated catalyst device 100 according to the first exemplary embodiment can be obtained as shown in FIG. 3.

(Second Exemplary Embodiment)

Figure 7:
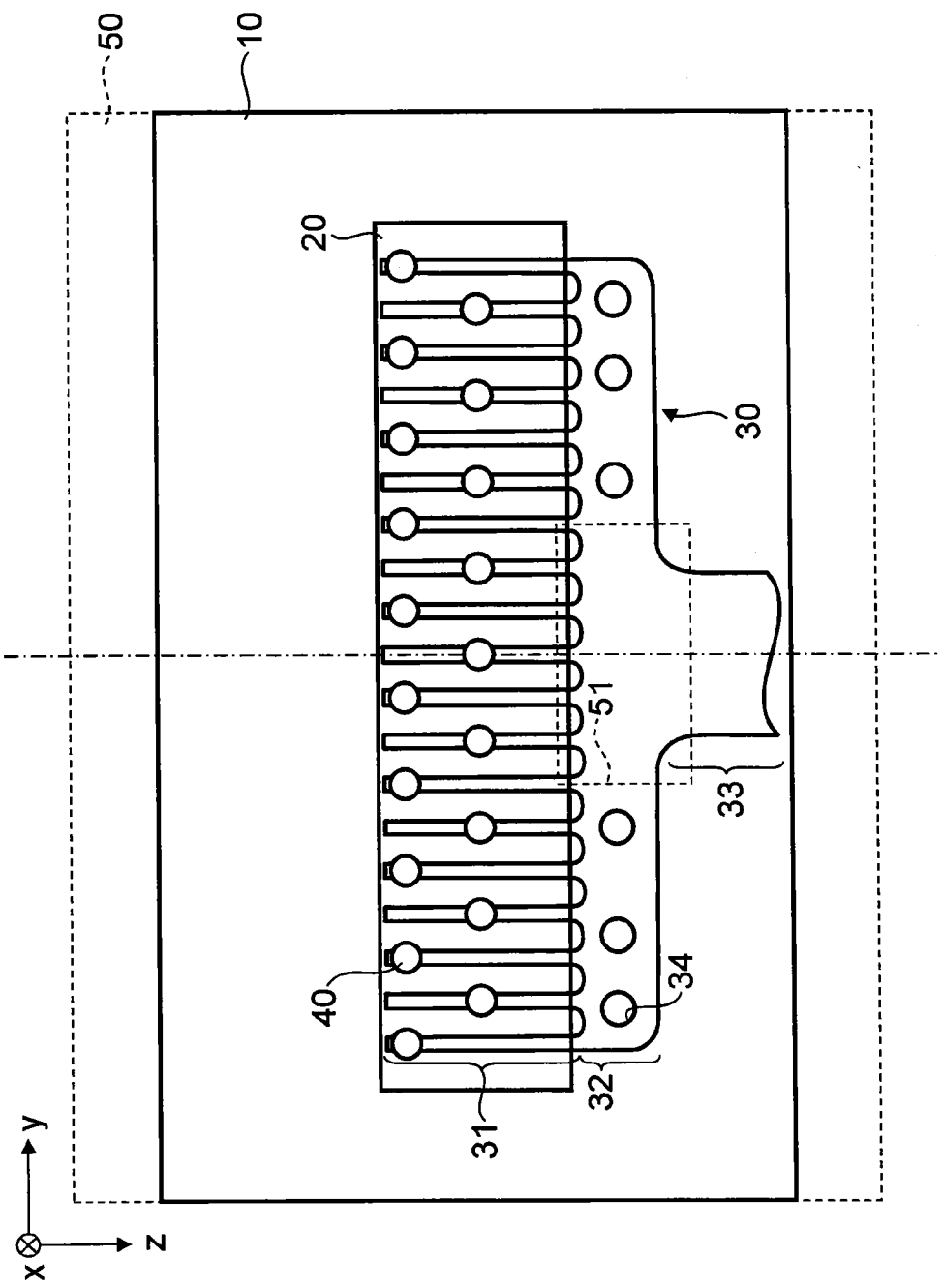
FIG. 7 is a plan view of a surface electrode 20 of an electrically heated catalyst device according to a second exemplary embodiment as viewed from directly above the surface electrode 20.
Figure 8:
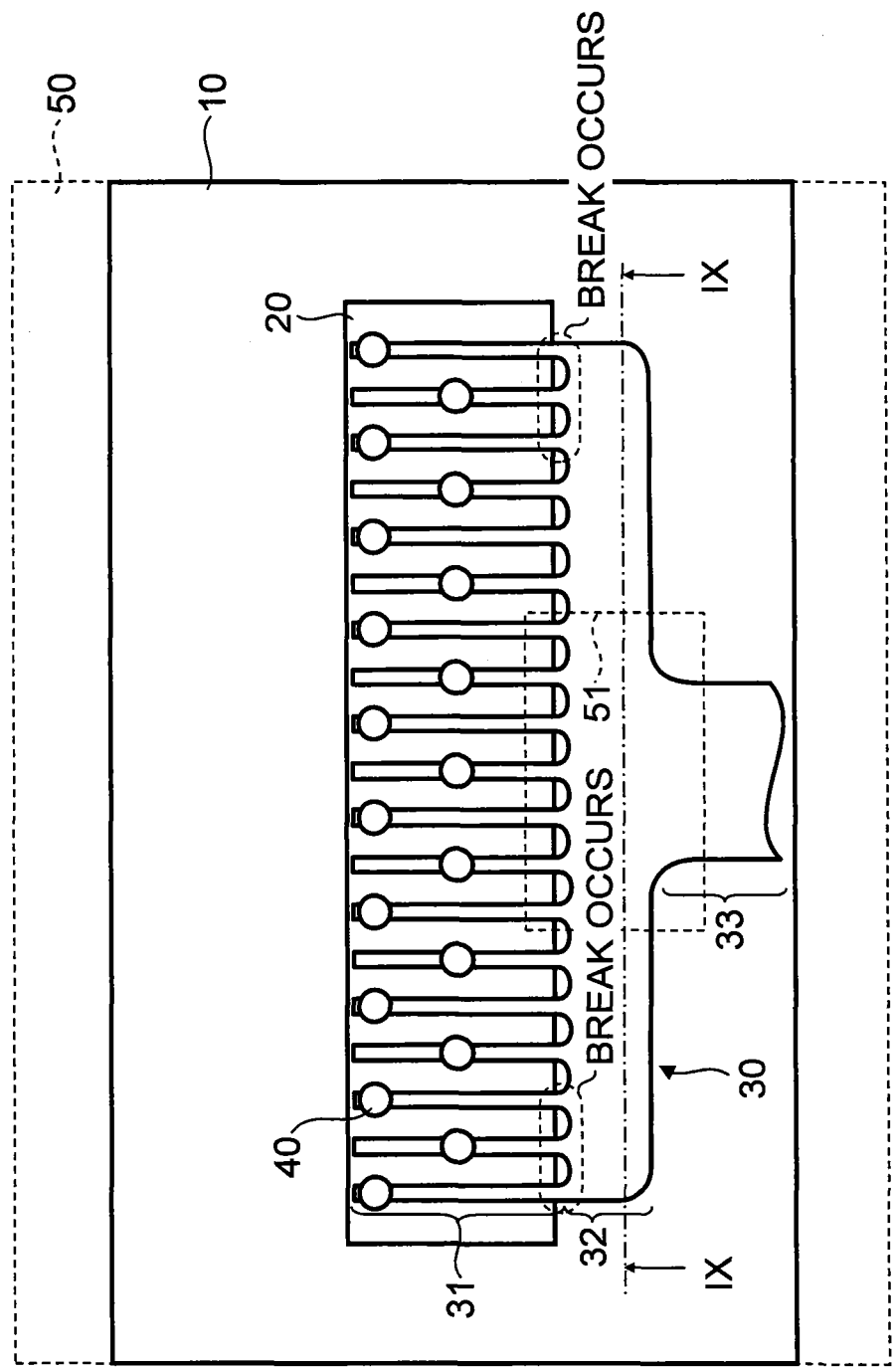
FIG. 8 is a diagram for explaining a problem to be solved by the present invention, and is a plan view of an example of a related art electrically heated catalyst device as viewed from directly above a surface electrode.

Next, an electrically heated catalyst device according to a second exemplary embodiment is explained with reference to FIG. 7. FIG. 7 is a plan view of a surface electrode 20 of the electrically heated catalyst device according to the second exemplary embodiment as viewed from directly above the surface electrode 20. As shown in FIG. 7, in the electrically heated catalyst device according to the second exemplary embodiment, three through-holes 34 are formed on each of the left and right sides of the central part of the wiring line member 30 in the axial direction of the catalyst support (y-axis direction). That is, six through-holes 34 are formed in total in the electrically heated catalyst device. Further, the interval between adjacent through-holes 34 become narrower as the location of the interval gets away from the central part of the wiring line member 30 and gets closer to the left or right end thereof. Therefore, the electrically heated catalyst device according to the second exemplary embodiment can suppress the inward shifting of both ends of the root section 32, which is caused by repeated rises and falls of the temperature, more effectively than the electrically heated catalyst device according to the first exemplary embodiment.

Note that the present invention is not limited to the above-described exemplary embodiments, and various modifications can be made without departing from the spirit of the present invention.

For example, even when the opening 51 of the mat 50 is not located above the root section 32, the inward shifting of both ends of the root section 32, which is caused by repeated rises and falls of the temperature, can be suppressed by forming the through-holes 34 or the protrusions 34a in the root section 32.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An electrically heated catalyst device comprising:
a catalyst support supporting a catalyst;
a surface electrode disposed on an outer surface of the catalyst support, the surface electrode extending in an axis direction of the catalyst support;
a wiring line member comprising a root section extending in the axis direction of the catalyst support and comb teeth-like wiring lines extending from the root section in a circumferential direction of the catalyst support, the comb teeth-like wiring lines being fixed to the surface electrode, wherein the root section is not fixed to the surface electrode, and the root section and the comb teeth-like wiring lines are integrally formed;
an outer cylinder covering the outer surface of the catalyst support; and a holding member holding the catalyst support, the holding member being packed between the catalyst support and the outer cylinder, wherein
the catalyst support is heated by feeding a current through the surface electrode and the wiring line member,
the holding member comprises an opening for allowing the wiring line member to be pulled out,
the opening of the holding member is located at a central part of the root section in a longitudinal direction thereof,
other parts than the central part of the root section in the longitudinal direction thereof are pressed onto the catalyst support by the holding member,
the central part of the root section in the longitudinal direction thereof is not pressed onto the catalyst support by the holding member,
at least a plurality of through-holes or a plurality of protrusions are formed in the root section of the wiring line member covered with the holding member.

2. The electrically heated catalyst device according to claim 1, wherein the plurality of through-holes or the plurality of protrusions are arranged in a row in the axial direction of the catalyst support from a central part of the wiring line member towards both ends thereof.

3. The electrically heated catalyst device according to claim 2, wherein an interval between adjacent through-holes or adjacent protrusions become narrower as a location of the interval gets away from the central part of the wiring line member and gets closer to either end thereof in the axial direction of the catalyst support.

4. A manufacturing method of an electrically heated catalyst device, comprising:
- providing a surface electrode on an outer surface of a catalyst support supporting a catalyst, the surface electrode extending in an axis direction of the catalyst support;
- fixing comb teeth-like wiring lines of a wiring line member to the surface electrode, the wiring line member comprising a root section extending in the axis direction of the catalyst support and the comb teeth-like wiring lines extending from the root section in a circumferential direction of the catalyst support, wherein the root section is not fixed to the surface electrode, and the root section and the comb teeth-like wiring lines are integrally formed;
- covering the outer surface of the catalyst support with the wiring line member fixed thereon with a holding member for holding the catalyst support; and
- pressing the catalyst support covered with the holding member into an outer cylinder, wherein
- the holding member comprises an opening for allowing the wiring line member to be pulled out,
- in the covering of the outer surface of the catalyst support with the holding member, the opening of the holding member is located at a central part of the root section in a longitudinal direction thereof,
- in the pressing the catalyst support covered with the holding member into the outer cylinder, other parts than the central part of the root section in the longitudinal direction thereof are pressed onto the catalyst support by the holding member and the central part of the root section in the longitudinal direction thereof is not pressed onto the catalyst support by the holding member, and
- at least a plurality of through-holes or a plurality of protrusions are formed in the root section of the wiring line member, which is to be covered with the holding member, prior to the covering of the outer surface of the catalyst support with the holding member.

* * * * *